W. MORRISON.
POWER INSTALLATION.
APPLICATION FILED FEB. 3, 1908.
1,044,409.
Patented Nov. 12, 1912.
4 SHEETS—SHEET 1.
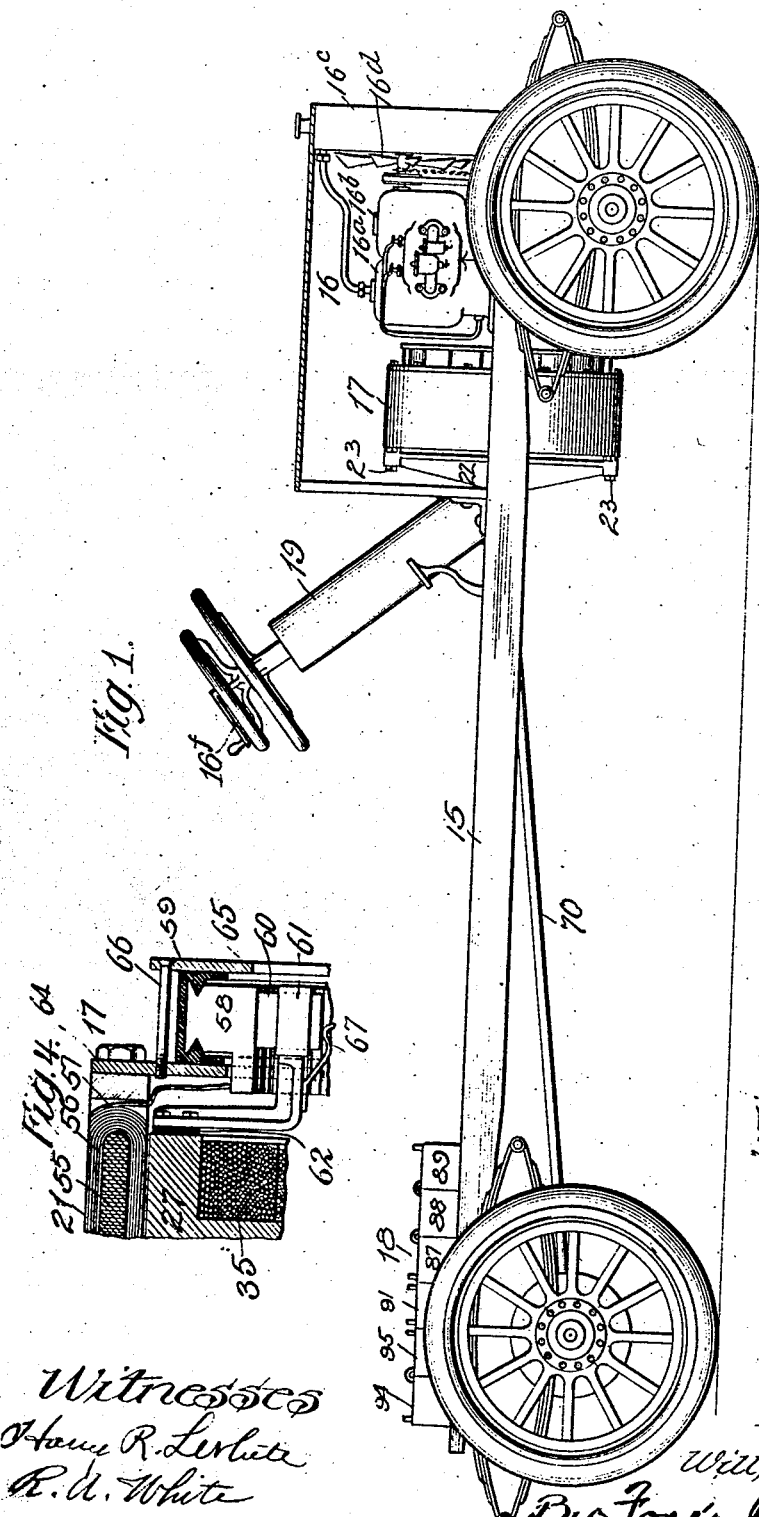
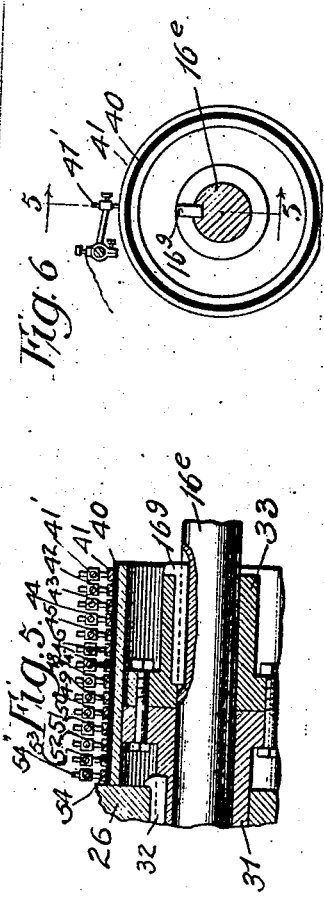
Witnesses
Inventor
William Morrison W. MORRISON.
POWER INSTALLATION.
APPLICATION FILED FEB. 3, 1908.
1,044,409.
Patented Nov. 12, 1912.
4 SHEETS—SHEET 2.
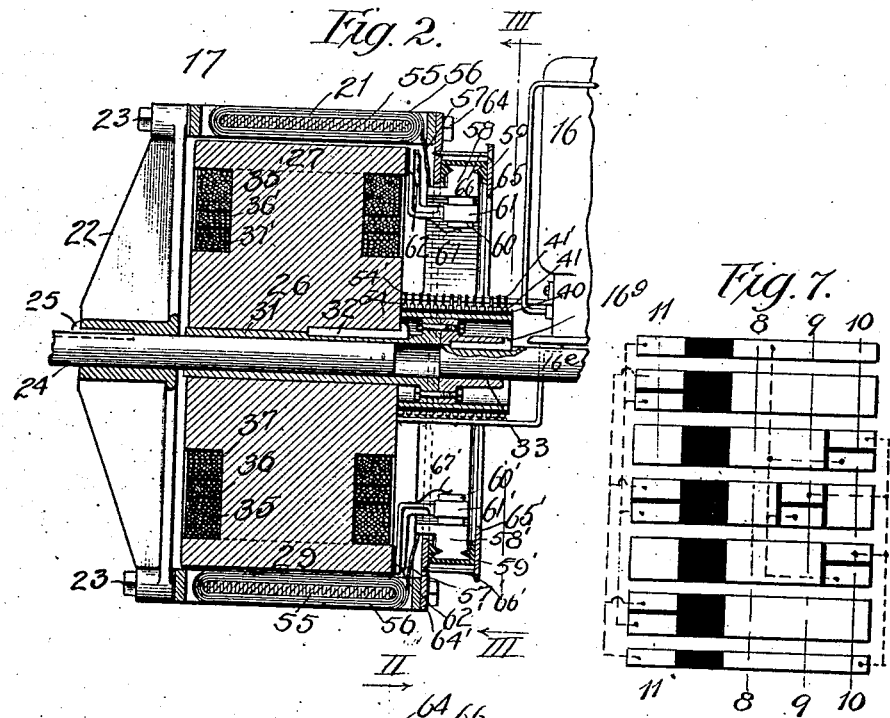
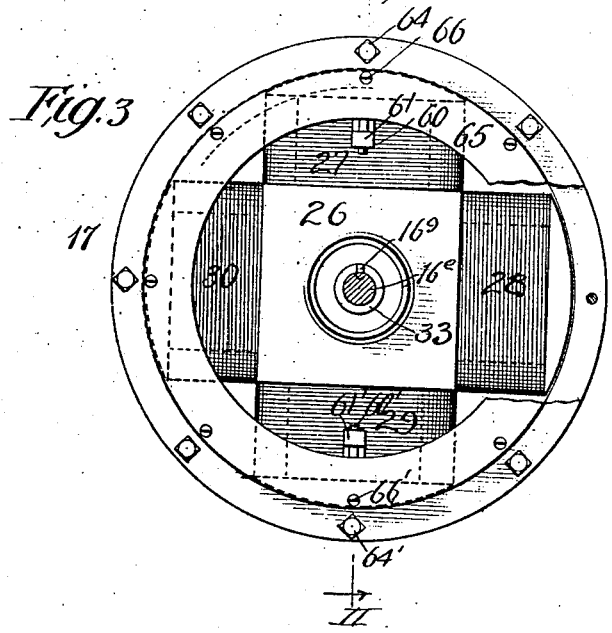

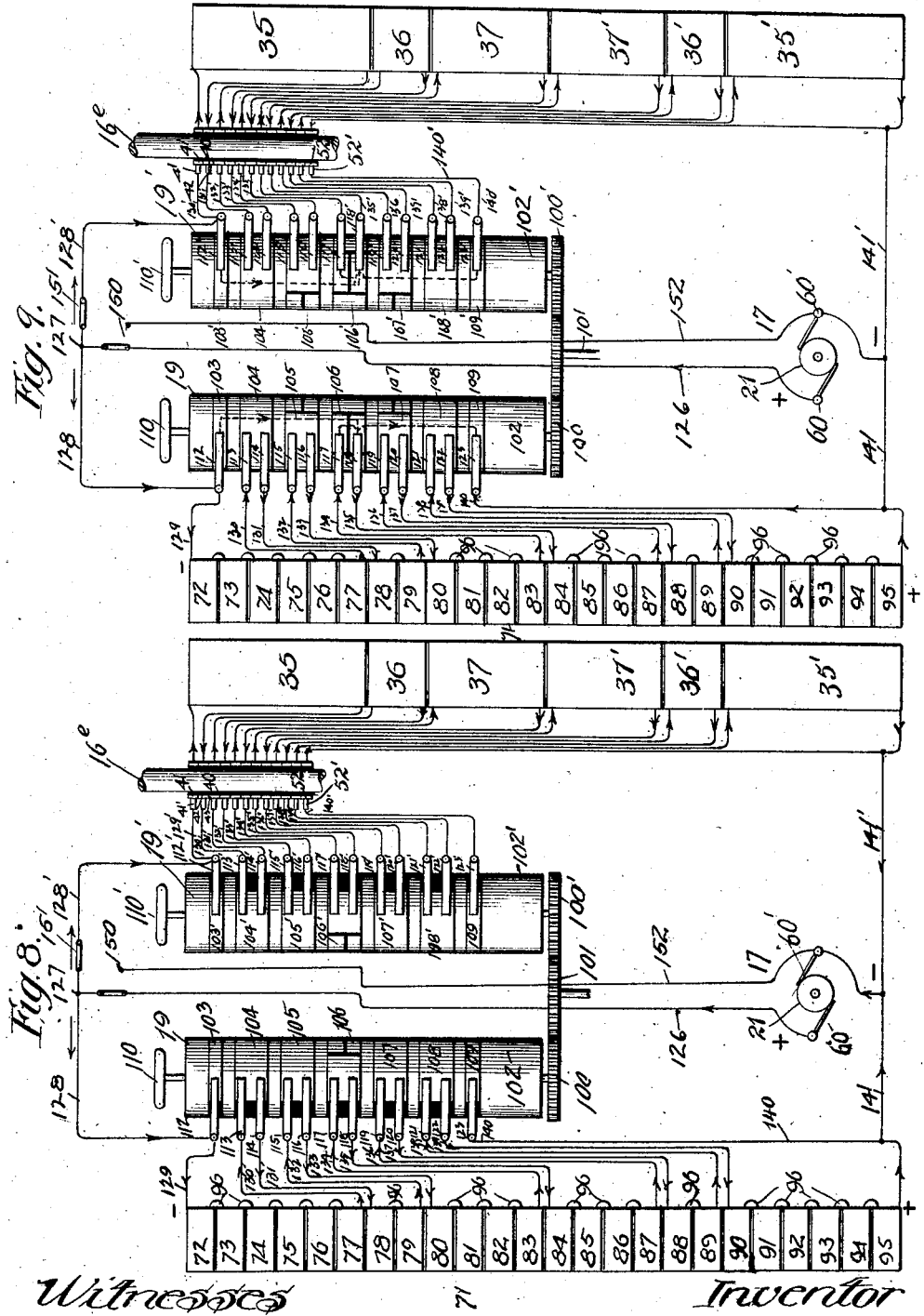

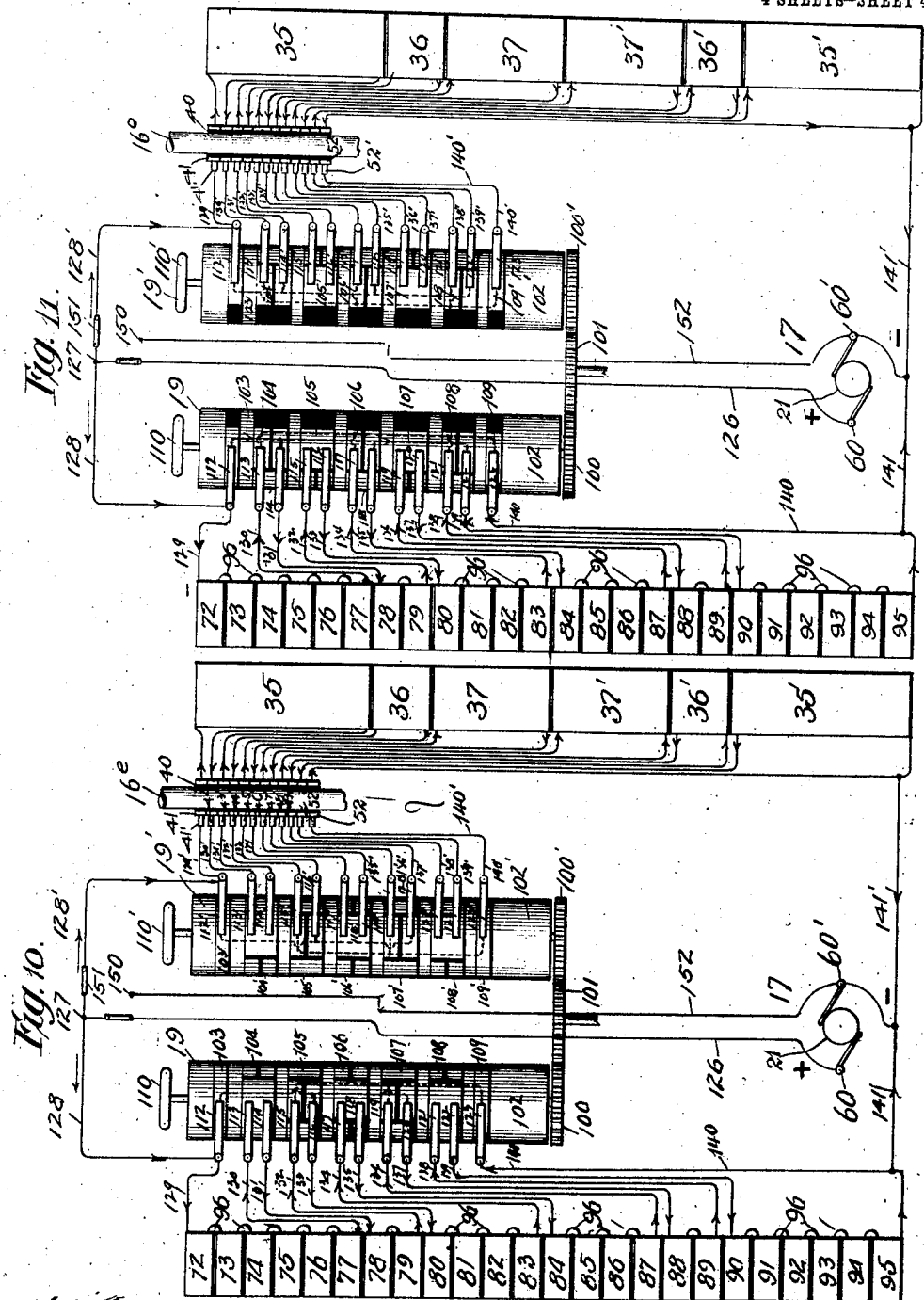

UNITED STATES PATENT OFFICE.

WILLIAM MORRISON, OF CHICAGO, ILLINOIS.

POWER INSTALLATION.

1,044,409.   Specification of Letters Patent.   Patented Nov. 12, 1912.

Application filed February 3, 1908.   Serial No. 414,025.

*To all whom it may concern:*

Be it known that I, WILLIAM MORRISON, a citizen of the United States, residing at Chicago, in the county of Cook and State of Illinois, have invented certain new and useful Improvements in Power Installations, of which the following is a specification.

My invention relates to improvements in power installation and more particularly to power installation wherein the prime mover is an internal combustion engine and the power transmitting connection between said prime mover and an object to be driven includes a dynamo-electric machine, or dynamotor operating as a magnetic clutch.

The general object of my invention is to provide a power installation, especially adapted for use in propelling motor vehicles, in which the internal combustion engine coöperates with such an electric equipment that energy developed in the engine may be converted into electric energy and conserved in suitable storage batteries and thereafter utilized to start the engine or drive the load, and whereby an electro-magnetic power transmission may be interposed between the gas engine and the driving wheels.

A more particular object of my invention is to provide an arrangement whereby the dynamotor may constitute a very efficient clutch and whereby the speed of the vehicle may be gradually varied by varying the association and inter-relation of the electrical devices, without producing unpleasant jars and jerks, which are common to the use of mechanical speed changing devices, such as variable gearing.

A further object of my invention is to provide an electrical installation wherein the use of rheostats or intrinsic resistances may be dispensed with, and at the same time to provide a convenient and practical arrangement for starting the internal combustion engine, and enabling variations in relative speed between the load-driving mechanism and the prime mover to be effected through the electrical instrumentalities.

Another object is to provide a system wherein the dynamotor may be of small size for the work to be done.

Many other and further objects of my invention will become apparent to those skilled in the art from the following specification taken in conjunction with the drawings, wherein—

Figure 1 is an elevation of the chassis of an automobile having a hood broken away and showing parts of the dynamo-electric machine and internal combustion engine; Fig. 2 is a central vertical section of the dynamo-electric machine on line II—II of Fig. 3; Fig. 3 is a transverse section of the same on line III—III of Fig. 2; Fig. 4 is a fragmentary enlargement of part of the field, armature, and commutator of the dynamo-electric machine. Fig. 5 is a longitudinal section of a cylinder whereby electric communication with the coils of a rotating field magnet is commutated; Fig. 6 is an end view of the same; Fig. 7 is a flat development of a controller cylinder; Figs. 8, 9, 10, and 11 are diagrammatic and schematic representations of the electric circuits and parts in the various positions in which they are placed in the several steps which may be taken in controlling the speed of the vehicle.

In general my invention contemplates the association with an automobile or other machine,—the movement of the driving wheels of which constitutes what I may term the physical load,—of a prime mover in the form of a gas engine, having no direct physical connection with the driving wheels, but having in suitable connection therewith a dynamo-electric machine, which in turn has suitably connected therewith a set of storage batteries. The dynamo-electric machine—or dynamotor, as I shall hereafter term it—is adapted for operation either as a generator or as a motor, and has both of its elements revoluble, one such element having mechanical connection with the rotative parts of the gas engine, and the other said element constituting a load-moving part, having rotative connection with the automobile driving wheels. The storage battery, in general, has appropriate connection with the dynamotor, to supply current thereto to operate the machine as a motor, or to receive current therefrom when the machine is operating as a generator. Such a general arrangement I do not claim as new, but in the embodiment of this idea heretofore it has been customary to control the resistance relationship between the various electrical parts to secure desired electrical conditions by including or eliminating different dynamotor windings or batteries, or by the use of rheostats as intrinsic resistances. These undesirable features of such systems my present invention dispenses with, by provision of a new and highly efficient arrangement of the dynamotor field and the batteries.

In the practice of my present invention I provide in the field winding of the dynamotor,—which is preferably shunt wound,—a number of distinct coils, connected with a controller device by which the several coils, though constantly included in the field circuit, may be arranged therein in various electrical relationships, varying from a series relation, through one in which the coils are divided into two equal parallel groups, and so on, to a relationship providing any predetermined number of equal parallel branches, which I will for convenience term the maximum number of parallels, thereby giving the field circuit a widely variant range of resistance while maintaining it constantly subject to the full potential difference between the armature terminals. The storage batteries are also arranged in conjunction with a controller so that they, similarly, may be included in a battery circuit in different relationships from a series relation to a relation providing a number of groups connected in parallel, thereby widely to vary the E. M. F. of the battery circuit; and the controlling parts for the battery connections and the field winding connections are associated to constitute together a controlling instrumentality for effecting coincidentally corresponding changes in the relation existing between the several field coils and the relation existing between the battery groups. I have found that by such arrangement, permitting decrease in the resistance of the shunt field circuit, within the field itself, while the field is subject to the full potential between the armature terminals, I am enabled to produce a power-transmitting dynamotor, which will transmit rotation from a prime mover to a load shaft with a minimum slippage or difference of R. P. M. between the two dynamotor elements, and am able to use a very small dynamotor for the necessary work. Further by commutating the batteries correspondingly with the commutation of the field coils in starting the prime mover, I can throw the battery current into the armature without interposing any intrinsic resistance, or resistance as such, and yet develop power and speed in the dynamotor sufficient easily to start the prime mover.

Referring now to the specific construction shown in the drawings, 15 indicates the frame of an automobile upon which are mounted the elements of my power installation, comprising generally a gas engine 16, a dynamotor 17, a series of storage batteries, 18, and a controlling mechanism 19, all of which will be more fully described. The gas engine 16 constituting the prime mover is illustrated as an ordinary type comprising a suitable number of vertical cylinders $16^a$, $16^b$, a radiator $16^c$, a fan $16^d$, driving shaft $16^e$, and spark controller $16^f$. The dynamotor 17 comprises a field and an armature, one rotatable with the engine shaft and the other, constituting a load moving part, rotatable with a transmission shaft having no physical connection with the engine shaft, but suitably connected with the driving wheels of the vehicle. Specifically the dynamotor consists of an external armature 21 connected to a spider 22 by bolts 23, the spider being connected by key 25 to a transmission shaft 24, which has connections, as through a tumble shaft 70 and other common connections, with the driving wheels of the vehicle. An internal field magnet 26, having four pole pieces 27, 28, 29, and 30 is secured to a sleeve 31 as by means of a key 32, the sleeve 31 surrounding and rotating upon the forward extremity of the armature shaft 24, and being connected for rotation by a coupling 33 and key $16^g$ to the engine shaft $16^e$. Thus in general I provide a dynamotor, comprising a field and an armature co-axially rotatable, one such element being connected to the engine or prime mover to be driven thereby or to drive the same, and the other element being adapted to drive a load.

Electrically the dynamotor 17 has its armature constructed as usual, but the field winding is made up of a number of coils or divisions capable of being grouped in different electrical relationships in the field circuit from a series arrangement to a multiple arrangement of a number of equal branches, and the field winding as a whole is constantly connected—whether its divisions are in series or in parallel relation to each other—in a field circuit which is in shunt to the armature. Specifically in the construction shown, the field winding is composed of twelve physically distinct divisions or coils. For simplicity the wiring diagrams show the six coils with two opposite pole pieces 27, 29, only, numbered 35, 35', 36, 36' and 37, 37', said coils being preferably so wound that two coils 36 and 36' are each of a resistance which I may term the unit of field resistance; two other coils as 37, 37' are each of twice such unit resistance, and the remaining coils 35, and 35' are each of three such units resistance. Thus when all the six coils are (1) grouped in series their joint resistance is twelve units, but they are capable of being grouped in (2) two parallel groups of six units resistance each; in (3) three parallel groups of four units resistance each or in (4) four parallel groups of three units resistance each, thereby widely to vary the total resistance of the field circuit although all the coils are constantly maintained therein. To enable the grouping of the field divisions in such varying relationship they must have connections to the exterior of the dynamo-electric machine capable of being manipulated, as by the controller 19, in a manner to be described, and to provide such exterior connections for the rotating field units or divisions I provide upon the sleeve 31 of the field magnet an insulated drum 40 upon which are mounted insulated continuous metallic rings, in number twice that of the separate field-windings. For simplicity twelve rings are shown, marked with numerals 41 to 52 inclusive, a pair of such rings being provided for the two ends of each of the field winding sections, or, as shown, for the six windings of the pole-pieces 27, 29. On these rings bear stationary conducting brushes indicated by numerals 41' to 52'.

The armature 21 may be of any suitable construction, its rings 55, in the construction shown, having wound thereon a series of conducting coils 56, the terminals 57 whereof are connected to a series of commutator sections, 58, supported in an insulating structure 59 secured to the armature frame by side plates 64 and 65 bolted together as at 66, the commutator having bearing thereon internal brushes 60, 60' mounted in brush holders 61, 61' connected to the field magnet frame 26, and insulated therefrom as shown by insulation 62. The brushes 60, 60' are respectively connected to the external leads 126, 141, etc., by two insulated slip-rings 53, 54 with brushes (Fig. 5), on the sleeve 31.

As the field winding is separable into divisions for connection in the field circuit in different relations to vary the resistance of the field circuit, so the storage battery is divisible into groups of cells adapted for connection in the battery circuit in varying relations from series to multiple relation of a number of branches, to vary the potential which they impress upon the battery circuit.

The general scheme of division of the storage batteries in their circuit should preferably correspond with the divisions which may be effected with respect to the field coils, and therefore, I provide storage cells in number a multiple of twelve, specifically indicated by numerals 72 to 95 and permanently connect such cells together as to form six groups of batteries, two end groups 72 to 77 and 90 to 95 being of six batteries each; two intermediate groups, 78, 79, and 88, 89 being of two batteries each; and two middle groups 80 to 83 and 84 to 87 being of four batteries each. The twelve terminals of these battery groups and the twelve brushes 41', etc., field winding connections are connected to the controller 19 for control thereby to vary simultaneously and correspondingly the relation of the field coils in the field circuit and the battery groups in the battery circuit. The specific construction of the controller forms no part of my present invention, and may be varied as desired, but for convenience of illustration I show the controller 19 as consisting of two drums 102, 102' connected together for simultaneous uni-direction rotation by gears 100, 100' and 101 and manually rotatable by hand wheels 110, 110'. The cylinders 102 and 102' are shown as duplicates whereof the parts are indicated by like numerals of reference respectively without and with the exponent prime ('), each cylinder providing in insulated relation upon its surface a plurality of conducting rings indicated by reference numerals 103 to 109, each divided into a greater or less number of segments insulated from each other and arranged and connected together by wiring within the cylinder as shown in Fig. 7. By simultaneous movement through their gearing relation, the cylinders may be brought coincidently into positions such that the brushes 112—123 (shown in Figs. 8 to 11, inclusive) co-acting therewith make contact along any one of the several lines 8—8, 9—9, 10—10, and 11—11, (of Fig. 7) which respectively indicate the positions of the cylinders shown in Figs. 8, 9, 10, and 11. The brushes 112—123 for the battery controlling drum 102 are connected by wires 129—140 respectively to the terminals of the several battery groups heretofore described, while the brushes of the other drum are connected by wires 129'—140' to the brushes 41'—52' forming the stationary terminals of the field coils. Generally speaking these connections of the controller segments are such that connection may be effected between the field winding terminals on the one hand and the battery terminals on the other hand, to simultaneously and correspondingly change the relation of the field windings and the batteries in their respective circuits for series connection, or multiple connection of two or more branches.

The circuit connections are made from the armature terminal 60 by wires 126 and 127, thence by wire 128 to the brush 112 for the end battery 72, the brush 123 for the opposite end battery 95 having connection through wire 141 with the opposite terminal 60' of the armature, the wires 128 and 141 constituting part of what I will term the battery circuit. From the point 127 a wire 128' connects with the end brush 112' of the field coil connections, the opposite terminal of the field coil series having connection by wire 141' with armature terminal 60', so that the wires 128' and 141' form the terminals of a shunt field circuit connected directly across the armature terminals to receive the full potential of the armature. A switch 150 is arranged in the wire 126 for opening its connection with point 127 and closing connection with a wire 152 leading back to the brush 60' of the armature, thereby to establish a short-circuiting connection for said armature. An additional switch 151 may be provided, if desired, in the field shunt wire 128' for opening the latter.

The operation of the construction described is as follows: When the automobile is out of use and at rest the drums 102, 102' of controller 19, stand with their respective brushes all bearing upon the insulated zone (shown in Fig. 7 between the zones 8 and 11) and under such conditions no operative circuit is completed. To start the system in operation, the vehicle being at rest and its wheels being locked by the brakes, the controller drums are turned to bring the brushes along the line 11—11 of each drum, thereby to establish circuit connections as shown in Fig. 11 to group the storage cells into four groups of six cells each, in multiple, in the battery circuit and simultaneously to connect the field coils in four divisions, of three units resistance each, in multiple in the field circuit. Referring specifically to Fig. 11 the four groups of battery cells consist respectively of cells 72 to 77; 78 to 83; 84 to 89 and 90 to 95, all of the groups having their uppermost terminals connected to wire 128 and their lower terminals connected to wire 141; while the field's division consists respectively of section 35; sections 36 and 37; sections 35' and 36'; and section 37, all with their uppermost terminals connected to wire 128' and their lower terminals connected to wire 141'. Now current, of minimum potential obtainable through the storage battery arrangement, begins to flow from the batteries through the armature by wires 129, 128, 126, 141; and the shunt field by wires 128' and 141' and starts the dynamo in operation as a motor, the armature, connected to the load moving parts ultimately to be driven, remains at rest, while the field, connected to the prime mover to be started in operation, commences to move and slowly starts the prime mover. Under the conditions expressed, the battery produces its minimum electro-motive-force and may safely be placed in circuit with the armature without any intervening rheostat or intrinsic resistance, and the field circuit, offering its minimum resistance as a whole, enables the battery to energize the field to a sufficient magnetic density to start the machine. Manifestly, however, the motor at a low speed develops a counterelectromotive force commensurate with the low initial electromotive force of the batteries thus grouped in their maximum number of parallels; and to increase the motor speed, the initial E. M. F. must be increased. To increase the speed of the dynamotor step by step, therefore, the controller is moved through its successive steps shown respectively in Figs. 10, 9 and 8, the first such step grouping the battery cells in three divisions of eight cells each and the field coils into three divisions of four units each; the next step coincidently grouping the cells into two divisions of twelve cells each and the field into two divisions of six units each and the last step throwing all the cells into series relation and the field coils into series relation; so that generally stated, to speed up the motor, the voltage of the battery circuit is increased step by step and the resistance of the field circuit is commensurately increased. The maximum speed attained by the rotating field should be equal or close to the normal speed of the gas engine or prime mover, which, the throttle having been gradually opened and having attained its full velocity, begins to act as a driving rather than as a driven element and is in condition to carry its load.

We now have the engine rotating normally and are ready to start the vehicle. Up to this time the storage battery has been acting as a source of energy, but obviously as soon as the dynamo-electric machine begins operating as a generator, the storage battery as a whole becomes a part of its electric load, current generated by the dynamo-generator being "stored" in the storage battery. At the critical speed at which the rotating element of the dynamo-electric machine moves when the gas engine has attained full speed, the armature is in practically a neutral condition, its magnetic density is at a minimum value, and its poles are frequently reversed. To transmit power to the armature or load moving part, it is necessary, therefore, to increase the torque between the field and the armature. This is to be done by increasing the total current density in the armature without necessity of substantial change in the magnetic density of the field. To accomplish this the potential of the battery circuit should be reduced and the resistance of the field circuit lowered correspondingly, thereby to increase the electrical load upon the armature of the machine, which may now operate as a generator having a constantly driven rotatable field. To attain this end the controller is worked backward through the several steps, beginning with the condition shown in Fig. 8 and continuing through the conditions shown in Figs. 9 and 10, to that shown in Fig. 11. By each step the relation of the batteries in the battery circuit is changed to provide an increasing number of parallel groups of batteries with a commensurately decreasing number of batteries in each group, and correspondingly the field coils are thrown into parallel relations of increasing number of branches with the resistance of the field as a whole commensurately decreasing. With the first backward step described, establishing two parallel groups of batteries and two parallel field coil branches in the respective battery and field circuits, current flow in the armature instantly increases, the magnetic density of the field, owing to the multiple arrangement of its coils still remaining substantially the same. As a result the torque between the moving or field element and the stationary or armature element of the dynamotor is greatly enhanced, and the load begins to move. As soon as the load-moving parts begin to rotate and the armature correspondingly is revolving, the difference in speed between the armature and field decreases, thereby causing a decrease of electromotive force and current density of the armature. Therefore, the armature can not be made to revolve at the same rate as that at which the field magnet is moving. To further increase the speed of the armature and correspondingly more rapidly to drive the load-moving parts, the current density of the armature must again be increased, thereby to cause increased torque and this is accomplished by the second step of the controller, further paralleling the battery cells and the field coils. This operation is continued throughout the successive steps until the field coils are in their maximum number of parallel branches and the batteries correspondingly connected in their maximum number of branches, thereby to minimize the resistance of the field circuit as a whole and the resistance of the battery circuit as a whole. Under these conditions a very slight difference in speed of rotation between the armature and field suffices to generate current which will maintain the magnetic densities of the field and armature at such a value as to result in high magnetic torque, but if a yet stiffer magnetic connection between the elements of the machine is desired the armature may be short-circuited through the switch 150 and the field energized solely from the battery circuit, the potential of which may be varied by operation of the controller 19. The batteries are, therefore, useful in several particulars, primarily as a means for starting and supplying power to start the engine by causing the dynamotor to operate as an electric motor until the normal speed of the engine has been attained; also instantly to bring the field magnet up to the desired degree of magnetic saturation after each step in the process of control is made, and before the magnetic change can be realized in the armature, as there must, of course, be some relative movement of the armature and field magnets at the changed rate of velocity before current change is effected therein; and further, to energize the field if it is desired to short circuit the armature to increase the stiffness of the magnetic clutch.

Under no condition of operation need the battery be used as an auxiliary to the engine as a means for driving the load, and under no condition need the battery or any part thereof be disconnected from the circuit save when the whole system is out of operation; nor need any part of the field coils be out of the circuit; nor need any rheostat or intrinsic resistance be incorporated in any circuit either in starting, stopping, or intermediately controlling the operation of the system. It will be obvious further that the variations of the electrical connections of the field and battery constitutes an agency for varying the slipping or difference in speed between the armature as a load moving part and the field connected directly with the prime mover, so that the speed of the vehicle may be nicely controlled by varying the electrical connections thereby to vary the slip or difference in speed, either to supplement changes of speed occasioned by engine regulation or in lieu of such speed regulation through the engine. It will be further obvious that after the engine is in operation and the dynamotor begins to operate as a generator, the field-magnet coils are energized by current flowing from the armature due to the electromotive-force resulting from the difference in speed of the two elements of the dynamotor, and that the resistance of the field windings—always receiving the full potential of the armature—is decreased substantially proportionally to the difference in speed of the two dynamotor-elements to such a low resistance that the speed difference may be very small and yet be sufficient to generate the necessary electromotive-force. It will also be apparent that the system would operate substantially as has been described without the use of the batteries with the exception that the engine would have to be started manually or otherwise; the system would not be so immediately responsive to the operation of the controller, and the armature could not be absolutely short circuited unless the field were independently excited.

While I have herein described a single embodiment of my invention and shown the same in a convenient form in most particulars, it will be evident that considerable departure may be made from the precise arrangement and construction shown without departure from the spirit of the invention within the scope of the appended claims.

What I claim is:

1. In a system of the character described, the combination of a prime mover, a dynamotor comprising co-axially rotatable field and armature elements, one connected for rotation with the prime mover and the other adapted to drive a load, said field element comprising only windings connected in shunt across the armature terminals, a storage battery comprising a plurality of cells connected directly across the armature terminals, and means for co-incidently and correspondingly varying the field resistance and the battery potential, while maintaining the whole field and battery in their circuits and subject to the full potential across the armature terminals.

2. In a system of the character described, a prime mover, a dynamotor comprising two elements, namely, an armature and a field magnet revoluble about the same axis, one of said elements directly connected to the prime mover and the other element adapted to drive a load, said field magnet windings being composed of a plurality of coils arranged for connection in parallel or series, a storage battery comprising a plurality of cells, arranged for connection in parallel or series, and means for changing the parallel and series relation of the battery cells and coincidently changing the parallel and series relation of the coils to vary the torque between the said dynamotor elements.

3. In a system of the character described, a prime mover, a dynamotor, co-axially revoluble field and armature elements, one of the said elements directly connected to the prime mover and the other element adapted to drive a load, the windings of said field magnet comprising a plurality of coils in the field circuit adapted for connection in series or parallel relation, a storage battery comprising a plurality of cells adapted for connection in series or parallel relation in a battery circuit, said field and battery circuits being connected with the armature terminals, and a commutating device to coincidently vary the connections of the battery cells and field coils in their respective circuits from series to parallel for varying the torque between said dynamotor elements.

4. In a system of the character described, the combination of a prime mover, a dynamotor having an armature and a field magnet revoluble about the same axis, one element thereof connected to the engine and the other adapted to drive a load, and the field magnet windings comprising a plurality of coils, a plurality of battery cells, a circuit normally including said cells in a maximum number of parallel groups and said coils in a maximum number of parallels, and a controller adapted when turned in one direction gradually to change the said cells and said coils to series relation with respect to themselves to start the engine, and when turned in the opposite direction to change their relation back to parallel to vary the torque between said dynamotor elements.

5. In a system of the character described, the combination of a prime mover, a dynamotor having an armature and a field magnet revoluble about the same axis, one element connected to the engine and the other arranged to drive a load, a plurality of battery cells in a battery circuit for inclusion in parallel or series, and a plurality of field magnet coils in a field circuit for inclusion in parallel or series, a controller arranged to simultaneously control said relation of the batteries and of the coils to vary the potential of the battery circuit and the resistance of said field circuit to establish different electromagnetic relations between said armature and field magnet and a means for varying the speed of the prime mover to vary the speed of the load-driving element while maintaining constant the theretofore established electromagnetic relation of the armature and field magnet.

6. In a system of the character described, the combination of a prime mover, a dynamotor comprising coaxially revoluble armature and field elements, one connected to the prime mover and the other adapted to drive a load, a plurality of field coils connected with the armature terminals, a plurality of battery cells likewise connected with the armature terminals, and controlling means for coincidently commutating the field coils and the battery cells, movable to produce a series of relations between the battery cells and the field coils tending to increase the speed of the dynamo as a motor; and further movable to produce such relations in inverse order to increase the efficiency of the dynamo as a clutch.

7. In a system of the character described, a prime mover, a dynamotor comprising two elements; an armature and a field magnet, the latter having a plurality of coils, said elements revoluble about the same axis, one of said elements directly connected to the prime mover, and the other element adapted to drive a load, a storage battery comprising a plurality of cells, means for varying the resistance of the field by varying the relation of the coils and coincidently varying the E. M. F. of the battery by varying the relation of the cells, and means for disconnecting the armature from the battery and short-circuiting said armature.

8. In a system of the character described, the combination of a prime mover, a dynamotor having two adjacent wound rotors, one directly connected with the prime mover and the other adapted to be connected to the load, one of said rotors having a number of coils for grouping in various series and parallel relations, a storage battery having a number of cells for grouping in various series and parallel relations, and means for simultaneously varying the groupings of the several cells and coils to coördinate the E. M. F. of the battery and the resistance of the coils while maintaining said coils and cells in their circuits and subject to the potential across the terminals of the other rotor.

9. In a system of the character described, the combination of a prime mover, a dynamotor having two adjacent wound rotors, one directly connected with the prime mover and the other adapted to be connected to the load, one of said rotors having a number of coils for grouping in various series and parallel relations, a storage battery having a number of cells for grouping in various series and parallel relations, and means for simultaneously varying the groupings of the several cells and coils to coördinate the E. M. F. of the battery and the resistance of the coils whereby the magnetic density of the field produced by said coils is maintained substantially unchanged, while maintaining said coils and cells in their circuits and subject to the potential across the terminals of the other rotor.

10. In a system of the character described a prime mover, a dynamotor having a rotary armature and a rotary field magnet, one of such elements being directly connected with the prime mover and the other constituting a load-driving element, the field magnet having a plurality of coils for inclusion in circuit in shunt to the armature, a storage battery also connected in shunt to said armature and having a plurality of cells, and means for simultaneously varying the grouping of the coils and cells to coördinate the E. M. F. of the battery and the resistance of the coils whereby the magnetic density of the field produced by said coils is maintained substantially unchanged.

11. In a system of the character described, the combination of a prime mover, a dynamotor comprising an armature and a field-magnet both rotating in the same direction, one connected to the prime mover and the other connected to the load, a storage battery, said storage battery and said field-magnet being connected in shunt to the terminals of the armature, and means for simultaneously decreasing the voltage of the battery as a whole and decreasing the resistance of the field as a whole, whereby the speed of the load-driving shaft is increased.

12. In a system of the character described, the combination of a prime mover, a dynamotor comprising an armature and a field-magnet having a plurality of coils, both armature and field-magnet rotating in the same direction, one connected to the prime mover and the other connected to the load, a storage battery having a plurality of cells, said storage battery and said field being connected in shunt to the terminals of the armature, means for simultaneously varying the grouping of the coils and cells to correspondingly decrease the voltage of the battery and the resistance of the field whereby the speed of the load-driving shaft is increased.

13. In a system of the character described, the combination of a prime mover, a dynamotor comprising an armature and a field-magnet, both rotating in the same direction, one connected to the prime mover and the other connected to the load, a storage battery, said storage battery and said field being connected in shunt to the terminals of the armature, means for simultaneously decreasing the voltage of the battery as a whole and decreasing the resistance of the field as a whole, whereby the speed of the load-driving shaft is increased, and means for varying the speed of the prime mover whereby the speed of the load-driving shaft may be varied while maintaining practically constant the theretofore established electromagnetic relation of the armature and the field-magnet.

14. In a system of the character described, the combination of a prime mover, a dynamotor comprising an armature and a field-magnet having a plurality of coils, both armature and field-magnet rotating in the same direction, one connected to the prime mover and the other connected to the load, a storage battery having a plurality of cells, said storage battery and said field being connected in shunt to the terminals of the armature, means for simultaneously varying the grouping of the coils and cells to correspondingly decrease the voltage of the battery and the resistance of the field whereby the speed of the load-driving shaft is increased, and means for varying the speed of the prime mover whereby the speed of the load-driving shaft may be varied while maintaining practically constant the theretofore established electromagnetic relation of the armature and the field-magnet.

In testimony whereof I hereunto set my hand in the presence of two witnesses.

WILLIAM MORRISON.

In the presence of—
  Foreé Bain,
  Mary F. Allen.